United States Patent [19]

Grimes

[11] Patent Number: 5,383,015
[45] Date of Patent: Jan. 17, 1995

[54] OPTICAL TIME DOMAIN REFLECTOMETRY MEASUREMENTS ON A MULTI-BRANCH OPTICAL NETWORK USING MULTIWAVELENGTH PASS FILTERS

[75] Inventor: Gary J. Grimes, Thornton, Colo.

[73] Assignee: AT&T Corp., Murray Hill, N.J.

[21] Appl. No.: 995,103

[22] Filed: Dec. 22, 1992

[51] Int. Cl.$^6$ ............................................. G01N 21/88
[52] U.S. Cl. ..................................... 356/73.1; 359/110
[58] Field of Search ......................... 356/73.1; 359/110

[56] References Cited

U.S. PATENT DOCUMENTS

| | | | |
|---|---|---|---|
| 5,063,595 | 11/1991 | Ballance | 380/48 |
| 5,128,619 | 7/1992 | Bjork et al. | 324/533 |
| 5,177,354 | 1/1993 | Tomita et al. | 356/73.1 X |
| 5,187,362 | 1/1993 | Keeble | 356/73.1 |

FOREIGN PATENT DOCUMENTS

| | | | |
|---|---|---|---|
| 2-141641 | 5/1990 | Japan | 356/73.1 |
| 2264018 | 11/1993 | United Kingdom . | |
| 9316533 | 8/1993 | WIPO . | |

Primary Examiner—Vincent P. McGraw
Attorney, Agent, or Firm—John C. Moran

[57] ABSTRACT

Detecting and evaluating optical subcircuits created by optical splitters in an optical circuit. One or more optical wavelengths are utilized for the transmission of data; whereas, other optical wavelengths are utilized to perform optical time domain reflectometry measurements on each optical subcircuit. Following an optical splitter, each optical path from the optical splitter has inserted into it an optical filter which allows the transmission of the optical wavelengths utilized for data transmission and one of the optical wavelengths utilized to perform the optical time domain reflectometry measurements. An optical time domain reflectometry instrument transmits each of the optical wavelengths, utilized for testing, individually into the optical circuit and analyzes the returned optical pulse. Since only one optical subcircuit allows the passage of any given optical wavelength for testing, each optical subcircuit can be fully analyzed.

1 Claim, 5 Drawing Sheets

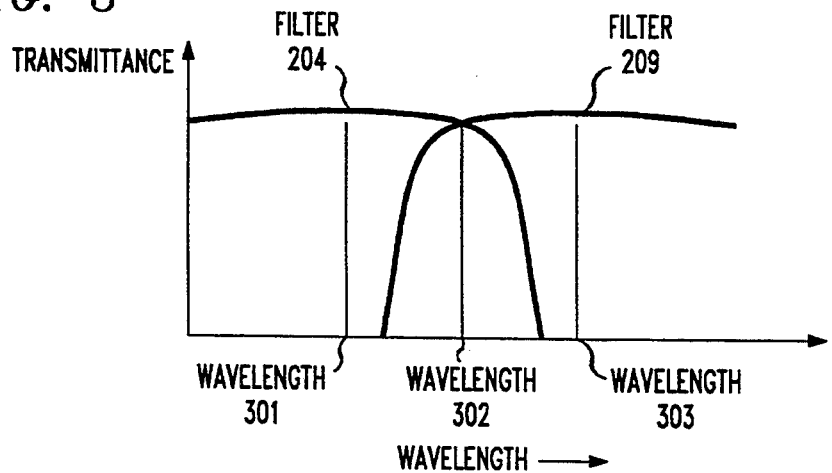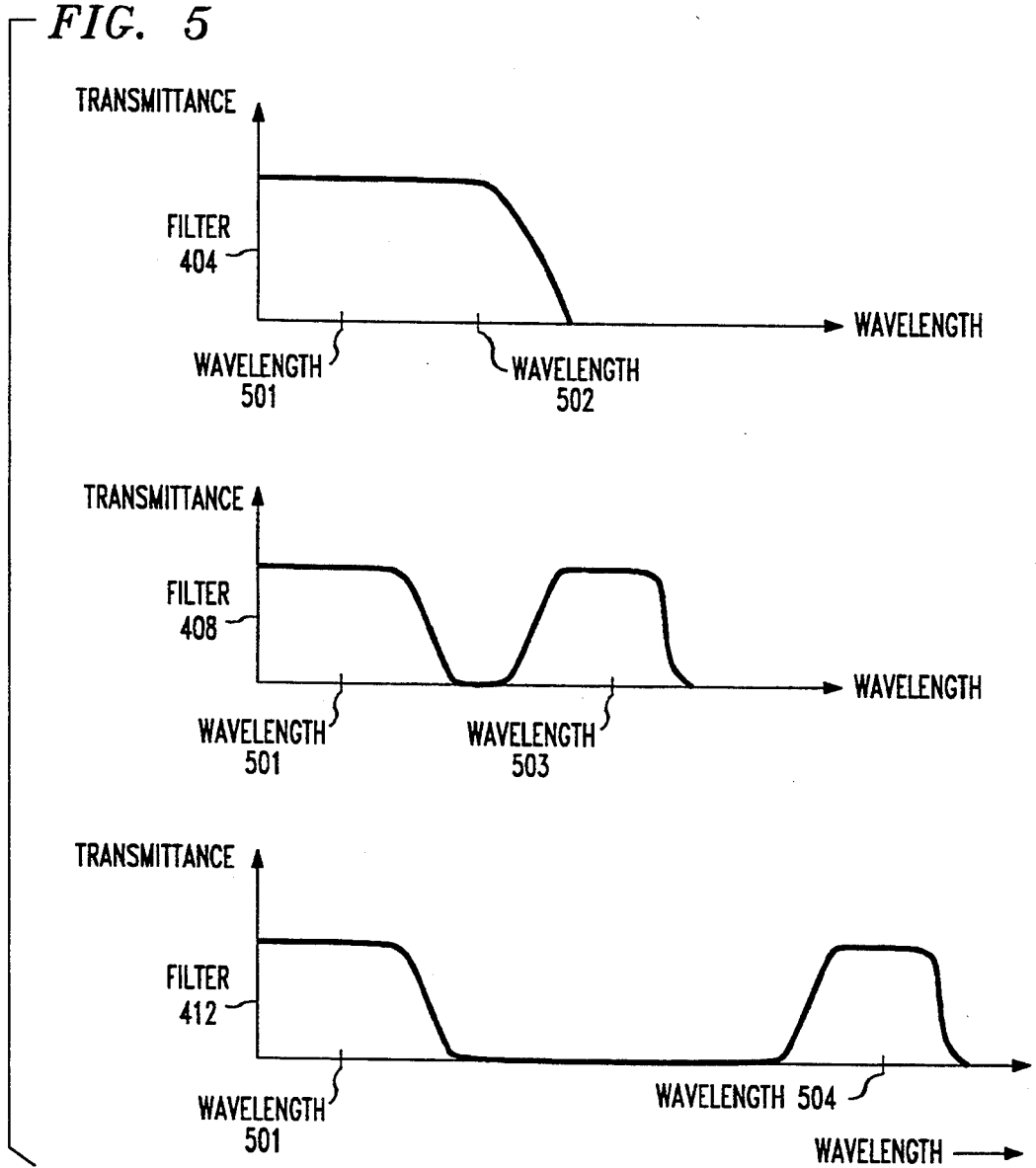

OPTICAL TIME DOMAIN REFLECTOMETRY MEASUREMENTS ON A MULTI-BRANCH OPTICAL NETWORK USING MULTIWAVELENGTH PASS FILTERS

TECHNICAL FIELD

This invention relates to optical networks and, in particular, to making optical time domain reflectometry measurements.

BACKGROUND OF THE INVENTION

Optical time domain reflectometry is a powerful tool for analyzing and characterizing passive optical circuits containing optical fibers, connectors, splicers, etc. Optical time domain reflectometry determines the loss and reflection properties of each element in the optical circuit by attaching an instrument to either end of the circuit (replacing either the transmitter or receiver) without disturbing the passive optical circuit. Optical time domain reflectometry sends a short pulse of light down an optical circuit and displays the amplitude of the reflected and scattered light as a function of time and distance. Fortunately, optical fiber is easily identified by optical time domain reflectometry because of Rayleigh scattering that results from small non-uniformity in the refractive index of glass or other media. Large, abrupt discontinuities in an optical path can be determined due to Fresnel reflections. Thus, it is possible to characterize each element as reflective or lossy or both, and to remotely measure the reflectance and loss of each element. In addition, optical time domain reflectometry is utilized to detect breaks in optical circuits.

Unfortunately, it is well known that optical time domain reflectometry cannot be utilized in optical circuits which contain an optical splitter. Utilizing techniques of the prior art, optical time domain reflectometry instrument (OTDR) 101 of FIG. 1 is incapable of measuring the optical circuit consisting of optical elements 102 through 111. The reason is that when the pulse of light is transmitted through splitter 103, splitter 103 splits the light into two halves. One-half the light goes through optical element 104 through 107 and the the other half of the light goes through optical elements 108 through 111. When the two light pulses reflect back from receiver 107 and receiver 111, OTDR 101 cannot distinguish which optical subcircuit is producing which portions of the returning light. Furthermore, if there are unknown numbers of optical splitters, it is not possible to determine how many optical subcircuits exist through use of the prior art optical time domain reflectometry techniques.

SUMMARY OF THE INVENTION

The foregoing problems are solved, and a technical advance is achieved in accordance with the principles of this invention incorporated in a method and apparatus that allow the detection and evaluation of an optical circuit having a plurality of optical subcircuits created by optical splitters. One or more optical wavelengths are utilized for the transmission of data; whereas, other optical wavelengths are utilized to perform optical time domain reflectometry measurements. Following an optical splitter, each optical path from the optical splitter has inserted into it an optical filter, which allows the transmission of the optical wavelengths utilized for data transmission and one of the optical wavelengths utilized to perform the optical time domain reflectometry measurements. An optical time domain reflectometry instrument transmits each of the optical wavelengths utilized for testing individually into the optical circuit and analyzes the returned optical pulse. Since only one optical subcircuit allows the passage of any given optical wavelength for testing, each optical subcircuit can be fully analyzed.

BRIEF DESCRIPTION OF THE DRAWING

FIG. 3 illustrates the relationship between a wavelength utilized to transmit data and wavelengths utilized to test optical circuits;

FIG. 5 illustrates the relationship between optical wavelengths for the second embodiment of the invention illustrated in FIG. 4;

DETAILED DESCRIPTION

Figure 1:
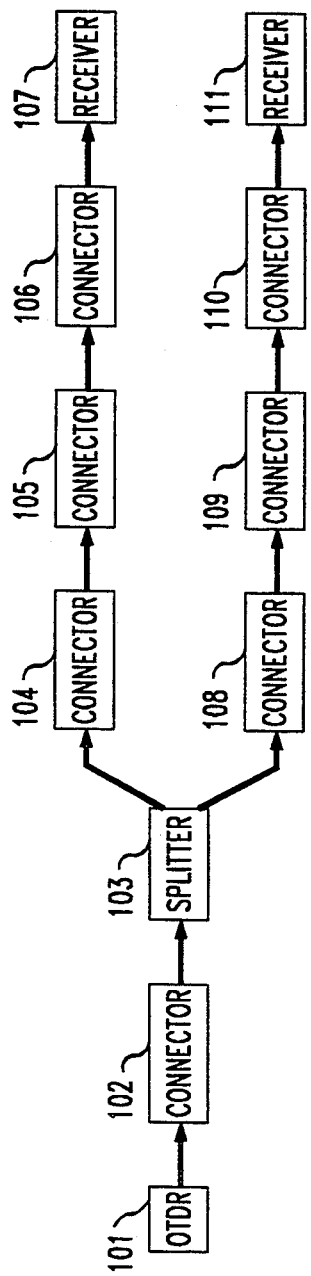
FIG. 1 illustrates, in block diagram form, a prior art optical time domain reflectometry instrument attempting to analyze an optical circuit having optical subcircuits.
Figure 2:
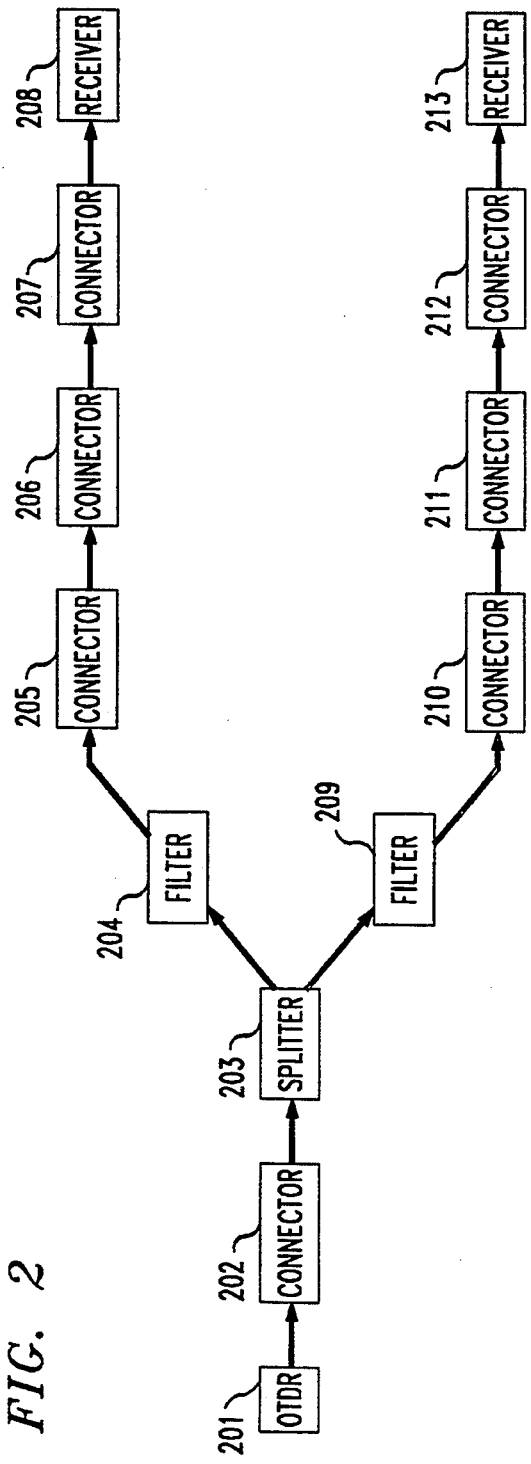
FIG. 2 illustrates, in block diagram form, an optical time domain reflectometry instrument and an optical circuit which in accordance with the invention allow the measurement of each optical subcircuit.

FIG. 2 illustrates an optical circuit having two optical subcircuits. The first optical subcircuit is formed by optical elements 204 through 208, and the second optical subcircuit is formed by optical elements 209 through 213. In accordance with the invention, optical time domain reflectometry instrument 201 uses one optical wavelength to test the first optical subcircuit and a second optical wavelength to test the second optical subcircuit. Filter 204 of the first optical subcircuit is responsive to the first test optical wavelength to transmit this optical wavelength in both directions; however, the second test optical wavelength is blocked by filter 204 from being transmitted to the remaining optical components of the first optical subcircuit. Similarly, filter 209 of the second optical subcircuit is responsive to the first test optical wavelength to block that wavelength from being transmitted through the remaining optical elements of the second optical subcircuit but is responsive to the second test optical wavelength to transmit that optical wavelength in both directions.

To test the optical path formed by optical elements 202 through 208, optical time domain reflectometry instrument 201 transmits a short light pulse of the first test optical wavelength which is transmitted through the optical elements. The return pulses then are received by optical domain reflectometry instrument 201, which analyzes them using well known techniques in the art. Similarly, optical time domain reflectometry instrument 201 uses the second test optical wavelength to test the path comprising elements 202, 203, and 209 through 213.

FIG. 3 illustrates the transmittance of filters 204 and 209 to the first and second optical wavelengths. The first test optical wavelength is wavelength 301, and the second test optical wavelength is wavelength 303. Wavelength 302 is used during normal operation of the optical circuit, illustrated in FIG. 2, for the transmission of data. As can be observed from FIG. 3, filter 204 does not transmit light at wavelength 303, nor does filter 209 transmit light at wavelength 301. Techniques for producing filters 204 and 209 are well known in the art.

Figure 4:
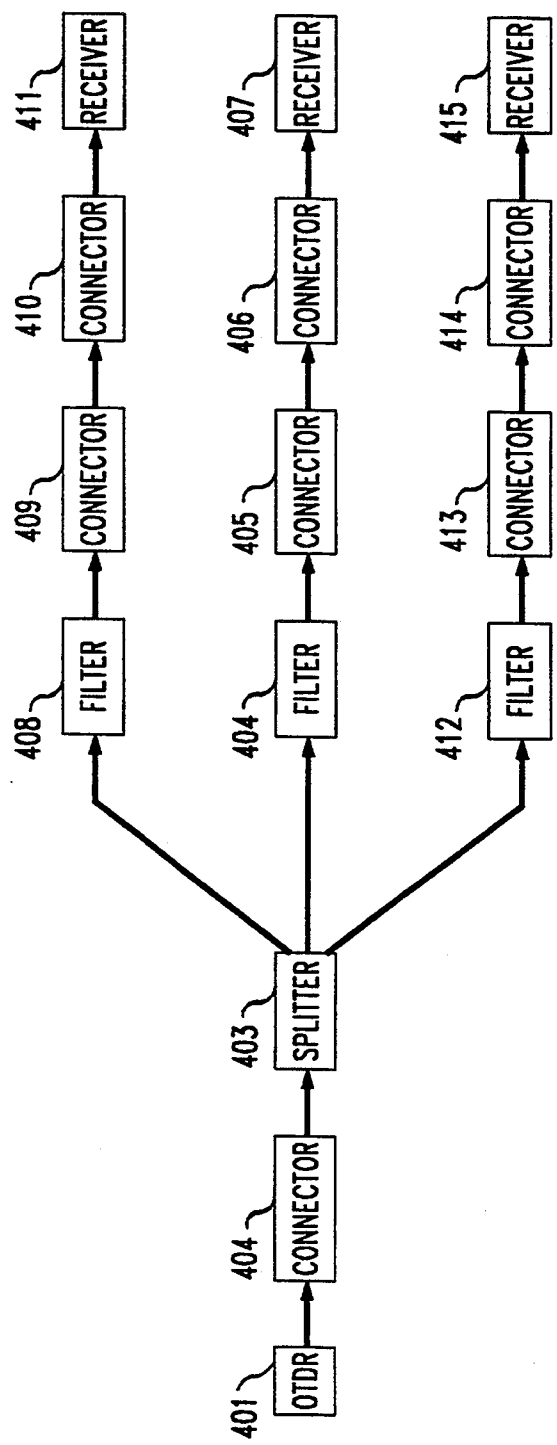
FIG. 4 illustrates second embodiment of the invention.

FIG. 4 illustrates an optical circuit having three optical subcircuits. FIG. 5 illustrates the transmittance characteristic of filters 404, 408, and 412. The first optical subcircuit is formed by elements 408 through 411, the second optical subcircuit is formed by elements 404 through 407, and the third optical subcircuit is formed by elements 412 through 415. As can be seen by FIG. 5, to test the first optical subcircuit in combination with coupler 402 and splitter 403, optical time domain reflectometry instrument 401 utilizes test wavelength 502 as illustrated in FIG. 5. Similarly, to test the second and third optical subcircuits in combination with elements 402 and 403, optical time domain reflectometry instrument 401 utilizes wavelengths 503 and 504, respectively. Wavelength 501 is utilized for the transmission of data through the optical circuit illustrated in FIG. 4.

Figure 6:
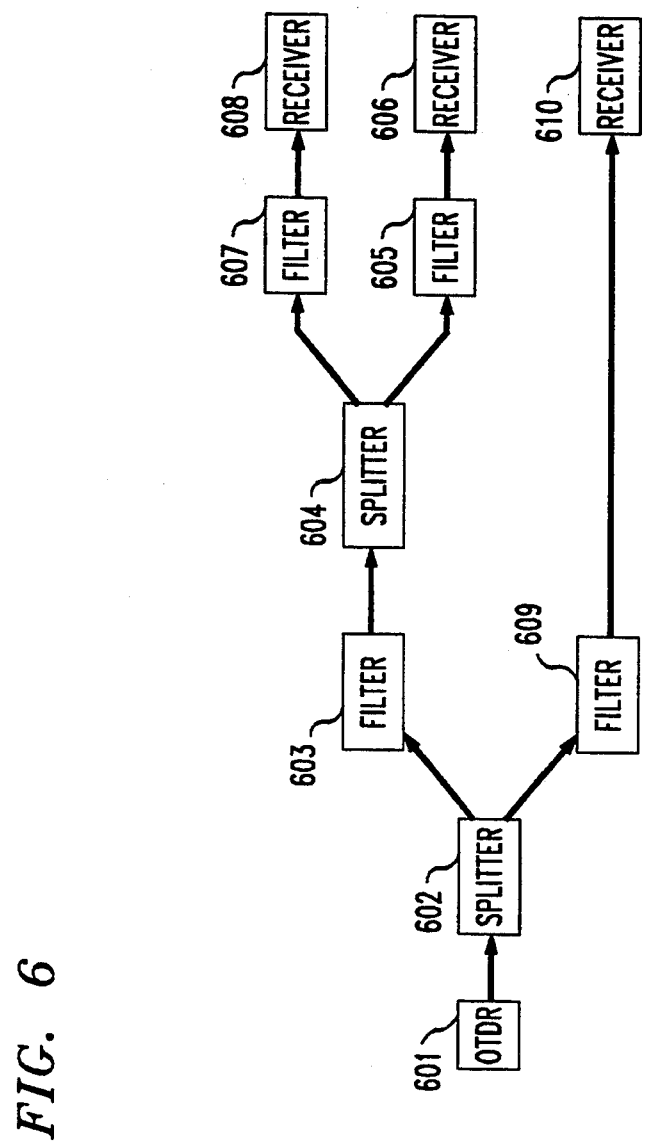
FIG. 6 illustrates a third embodiment of the invention.
Figure 7:
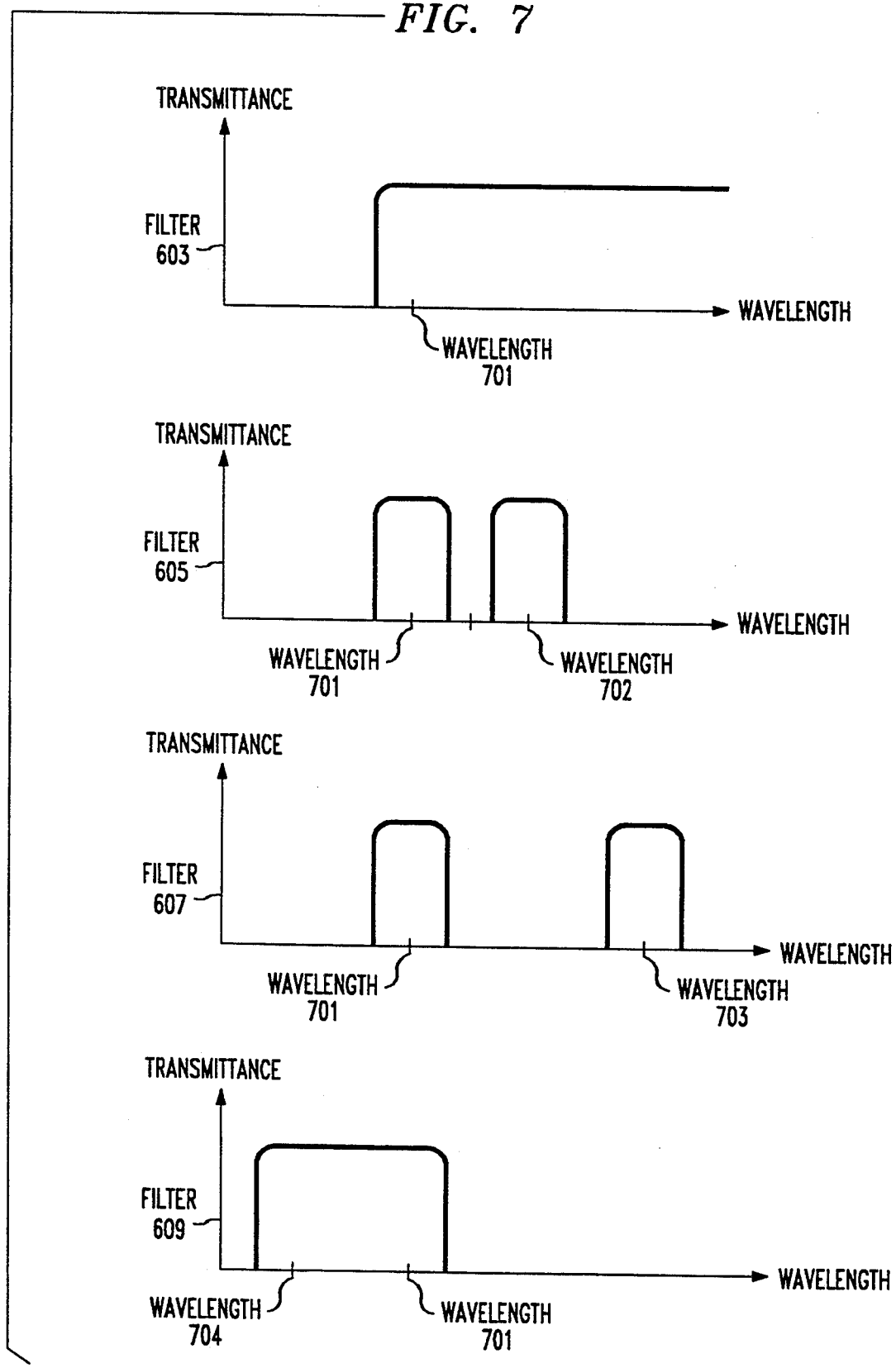
FIG. 7 illustrates the relationship between optical wavelengths for the third embodiment of the invention illustrated in FIG. 6.

FIG. 6 illustrates an optical circuit having two optical subcircuits with one of subcircuits having two additional subcircuits. FIG. 7 illustrates the transmittance characteristic of filters 603, 605, 607, and 609. The first optical subcircuit is formed by elements 603 through 608, and the second optical subcircuit is formed by elements 609 and 610. The first optical subcircuit has two additional subcircuits. The first additional subcircuit is formed by elements 605 and 606, and the second additional subcircuit is formed by elements 607 and 608. As can be seen from FIG. 7, to test the second optical subcircuit in combination with splitter 602, optical time domain reflectometry instrument 601 utilizes test wavelength 704 as illustrated in FIG. 7. Similarly, to test the first and second optical additional subcircuits in combination with elements 602, 603, and 604, optical time domain reflectometry instrument 601 utilizes wavelengths 702 and 703, respectively. Wavelength 701 is utilized for the transmission of data through the optical circuit illustrated in FIG. 6.

Optical filters having the charteristics illustrated in FIGS. 5 and 7 can be produced by a variety of well known optical techniques. Such filters may be purchased from Alliance Technique Industrielle of Evry Cedex, France. In addition, splitter 203, filter 204, and filter 209 of FIG. 2 can be fabricated as a single component using a fused biconical taper wavelength multiplexer/demultiplexer as described in the article entitled "Passive Fiber Optic Components Made by the Fused Biconical Taper Process", V. J. Tekippe, Proceedings of the Fifth National Symposium on Optical Fibers and Their Applications, Warsaw, Poland, Feb. 21–23, 1989, SPIE Vol. 1085, 1990.

It is to be understood that the above-described embodiments are merely illustrative of principles of the invention and that other arrangements may be devised by those skilled in the art without departing from the spirit or scope of the invention.

I claim:

1. An apparatus for testing an optical circuit having a first and second plurality of optical subcircuits, a plurality of optical filters and a plurality optical splitters, comprising:

a first one of the plurality optical splitters for dividing the optical circuit into the first plurality of optical subcircuits with each of the first plurality of optical subcircuits having one of a first set of the optical filters immediately connected to the first one of the plurality of optical splitters;

each of the first set of the optical filters capable of communicating a data optical wavelength and a set of test optical wavelengths unique to each of the first set of the optical filters;

a second one of the plurality of optical splitters for dividing one of the first plurality of optical subcircuits into a set of the second plurality of optical subcircuits each having one of a second set of the optical filters immediately connected to the second one of the plurality of optical splitters and each of the set of the second plurality of optical subcircuits terminated by an individual optical receiver; and each of the second set of the optical filters capable of communicating the data optical wavelength and one of the set of test optical wavelengths unique to the one of the first set of the optical filters that immediately follows the first one of the plurality of optical splitters so that the data optical wavelength and the one of the set of test optical wavelengths unique to each of the second set of the optical filters upon being launched at a start of the optical circuit are received by the optical receiver terminating the one of the set of the second plurality of optical subcircuits including the each of the second set of the optical filters for allowing the testing from the start of the optical circuit the one of the set of the second plurality of optical subcircuits without other optical receivers receiving the one of the set of test optical wavelengths.

* * * * *